No. 892,465. PATENTED JULY 7, 1908.
E. M. SWANSON.
LISTER CULTIVATOR.
APPLICATION FILED DEC. 14, 1906.
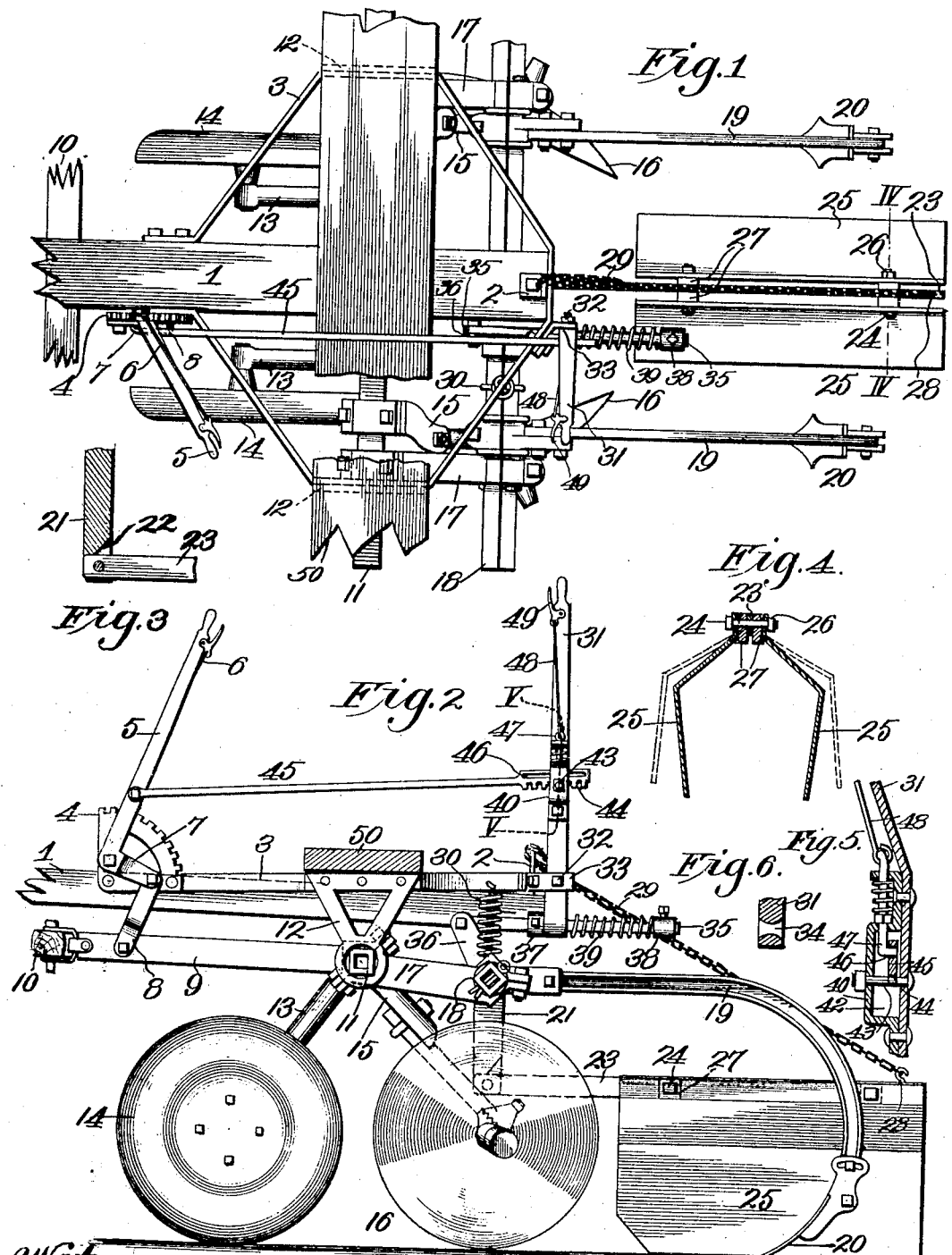
Witnesses
Frank R Glore
H. C. Rodgers.
Inventor
E. M. Swanson
By George H. Thorpe
Atty

UNITED STATES PATENT OFFICE.

ELMER M. SWANSON, OF SHENANDOAH, IOWA.

LISTER-CULTIVATOR.

No. 892,465.  Specification of Letters Patent.  Patented July 7, 1908.

Application filed December 14, 1906. Serial No. 347,900.

*To all whom it may concern:*

Be it known that I, ELMER M. SWANSON, a citizen of the United States, residing at Shenandoah, in the county of Page and State of Iowa, have invented certain new and useful Improvements in Lister-Cultivators, of which the following is a specification.

This invention relates to disk cultivators and more especially to that type for cultivating listed corn in which the draft shall tend to hold the cultivating appliances in the ground as exemplified in the patent for cultivator, #783,479, dated Feb. 8, 1905, my object in this connection being to generally improve the cultivator disclosed in my aforesaid patent and produce a machine which can be more easily handled and more perfectly controlled.

With this general object in view and others as hereinafter appear, the invention consists in certain novel and peculiar features of construction and organization as hereinafter described and claimed; and in order that it may be fully understood reference is to be had to the accompanying drawing, in which Figure 1, represents a plan view of a part of a two-row cultivator embodying my invention, with certain parts broken away. Fig. 2, is a side view of the same with the seat plank in section. Fig. 3, is a vertical section of the parts connecting the shovel-beam rock-shaft and the shield. Fig. 4, is a vertical section of the shield taken on the line IV—IV of Fig. 1. Fig. 5, is a vertical section taken on the dotted line V—V of Fig. 2. Fig. 6, is a vertical section of the lower end of the lever through which Fig. 5 is taken.

In the said drawings, 1 indicates the tongue, 2 an angle plate projecting upward from the rear end of the tongue and 3 a substantially diamond-shaped frame secured to plate 2 and to opposite sides of the tongue forward of said plate. 4 is a sector rigid with said frame and tongue and 5 a lever pivoted to the sector and provided with catch mechanism 6 for engagement with the sector.

7 is a crank arm projecting rearwardly from the lower end of the lever and connected pivotally by a link 8 with the draft-bar 9 underlying the tongue and equipped at its front end with a double-tree 10 and secured at its rear end to a rock shaft 11 journaled in bearing hangers 12 depending from opposite sides of frame 3.

13 indicates ground wheel arms secured rigidly but adjustably in any suitable manner, at their upper ends to rock shaft 11 and equipped with ground wheels 14 at their lower ends.

15 indicates arms extending downward and rearward from rock shaft 11 and equipped with cultivating disks 16. As thus far described the parts are in principle duplicates of the corresponding parts of the patented structure.

17 indicates a pair of arms rigid with and projecting rearwardly from rock shaft 11 and journaled in the rear ends of said arms is a shaft 18 carrying rearwardly projecting beams 19 equipped with shovels 20. Shaft 18 is also provided centrally with a depending arm 21 bifurcated at its lower end at 22, and pivoted in the bifurcation of said arm so as to be capable of swinging above but not below a predetermined point is a bar 23 connected by cross bolts 24 to the upper ends of a pair of plates 25, of substantially obtuse angle shape in cross section. The plates are disposed so that their upper portions shall converge toward the bar and together constitute a shield or fender for the plants, not shown.

The plates forming the fender are clamped in the desired position by nuts 26 engaging the threaded ends of the bolts and interposed between said bar and said plates and mounted on said bolts are wedge-shaped washers 27. These wedge-shaped washers may be arranged in the position shown or in an inverted position. In the former case, the plates of the shield occupy the relation shown in full lines and in the latter occupy the position shown in dotted lines and thus accommodate the plates having a greater lateral spread.

28 indicates a hook projecting upward from the rear end of bar 23, and 29 a chain extending from said hook up through the angle plate 2, to which it may be secured by looping the chain or in any other suitable manner.

30 indicates a retractile spring connecting frame 3 with the shaft 18 and under tension when the cultivating devices are depressed and adapted to coöperate in reëlevating said elements.

31 indicates a lever pivoted on bolt 32 in a bracket 33 secured to frame 3, and provided at its lower end with an opening 34 flared at both ends and receiving a rod 35 pivotally connected at its front end to a crank arm 36 of rock shaft 18.

37 and 38 are adjustable collars secured on said rod and 39 a spring mounted on the rod and interposed between collar 38 and the lever to hold the collar 37 pressed rearwardly against said lever and adapted to limit the depth of cut of the shovels independent of the depth of the cut of the disks, the spring 39 being adapted to yield in the event that the shovels strike obstructions in their path, said spring of course returning said shovels to their original positions as soon as the obstruction is passed.

40 is a bracket secured to lever 31 so as to form an opening 42 for said lever and bridging said opening is a pin or bolt 43 adapted to engage one or another of a longitudinal series of notches 44 in the lower edge of a link 45 pivotally connected at its opposite end to lever 5 and said link is provided with a longitudinal slot 46 slidingly engaged by a spring-depressed hook 47 carried by said lever, said hook being connected by a rod 48 to a pivoted grip 49 mounted at the upper end of lever 31. By grasping said lever and grip and applying pressure the hook is caused to raise the toothed link from engagement with pin 43 and while in such relation lever 31 or lever 5 can be pivotally operated so as to dispose the pin opposite a different notch, the notched link in this new relation engaging the pin as soon as the pressure is removed from the pivoted grip 49.

In practice the team is hitched to the double tree and as the machine is drawn forward the driver withdraws catch 6 from engagement with sector 4 and thus permits the pull of the team to force the cultivating devices into the ground, the distance the ground is penetrated being controlled by the driver who permits the catch to reëngage the sector at the proper time and thus lock the draft bar 9 from moving further upward, said draft bar being shown at approximately the maximum height to which it will be moved under the pull of the team when the lever is not locked upon the sector, it being apparent that the depression of the cultivating appliances is resisted by spring 30 and that any rocking movement imparted to rod 35 is accommodated by the flared opening 34 in lever 31. It will also be noticed that the shovels and the shield are held yieldingly depressed and therefore may ride over ordinary obstructions in their paths and that a variation in the yielding pressure with which the shovels are held depressed may be effected by adjustment of lever 31 on the link 45 or by adjustment of collar 38.

If it is found desirable to raise the shovels and shield materially above the ground without disturbing the disks, lever 31 is disengaged from the link and swung rearwardly, this action rocking shaft 18 in the proper direction to accomplish the result desired. If it be desired to raise the disks as well as the shovels and shield, the lever 5 is swung rearward, this action through the link 8 forcing draft bar 9 downward and forward so as to swing the frame further forward over the ground wheels, the latter remaining substantially immovable during this adjustment of the frame. The same action of course moves arms 17 and the cultivating appliances forward and upward, the spring 30 coöperating in this elevating action, and lever 31 effects the rotation of shaft 18 to rock the same and swing the shovels and shield upward.

The elevation of the shield and shovels may be increased by the rearward adjustment of lever 31 with respect to the link 45 as will be readily understood. The ground wheels, disks and shovels as in practically all machines of this type are adjustable on the rock-shafts for travel at varying distances from the row of plants, and the seat-plank is adapted to connect duplicate gangs in the usual manner and to carry the driver's seat, it being understood that I do not desire to be restricted to the exact details of construction shown and described as obvious modifications will suggest themselves to one skilled in the art.

Having thus described the invention what I claim as new and desire to secure by Letters Patent, is:—

1. In a cultivator, a tongue, a frame secured thereto, hangers rigid with the frame and tongue, a rock shaft journaled in the hangers, ground-wheel-carrying arms secured to the rock shaft, disk-carrying arms also secured to the rock shaft, bars projecting rigidly from the rock shaft, a rock shaft journaled in said bars and equipped with shovels, means tending to raise the last-named rock shaft, a draft bar rigidly secured to and projecting forward from the first-named rock shaft, a lever having an arm linked to said draft bar, and means to secure said lever at the desired point of adjustment.

2. In a cultivator, a tongue, a frame secured thereto, hangers rigid with the frame and tongue, a rock shaft journaled in the hangers, ground-wheel-carrying arms secured to the rock shaft, disk-carrying arms also secured to the rock shaft, bars projecting rigidly from the rock-shaft, a rock-shaft journaled in said bars and equipped with shovels, a spring connected to exert continuous upward pull on the last named rock-shaft, a draft bar rigidly secured to and projecting forward from the first-named rock-shaft, a lever having an arm linked to said draft-bar, and means to secure said lever at the desired point of adjustment.

3. In a cultivator, a tongue, a frame secured thereto, hangers rigid with the frame and tongue, a rock shaft journaled in the hangers, ground-wheel-carrying arms secured to the rock shaft, disk-carrying arms also secured to the rock shaft, bars projecting rigidly from the rock-shaft, a rock-shaft journaled in said bars and equipped with shovels, means tending to raise the last-named rock shaft, a draft bar rigidly secured to and projecting forward from the first-named rock-shaft, a lever having an arm linked to said draft-bar, means to secure said lever at the desired point of adjustment, a lever pivoted to said frame and linked to the first-named lever, and a connection between said lever and the shovel-equipped rock-shaft whereby forward movement of the lower end of the lever shall raise said shovels or permit the latter to rise without affecting said lever.

4. In a cultivator, a tongue, a frame secured thereto, hangers rigid with the frame and tongue, a rock shaft journaled in the hangers, ground-wheel-carrying arms secured to the rock shaft, disk-carrying arms also secured to the rock-shaft, bars projecting rigidly from the rock-shaft, a rock shaft journaled in said bars and equipped with shovels, a draft bar rigidly secured to and projecting forward from the first-named rock-shaft, a lever having an arm linked to said draft bar, means to secure said lever at the desired point of adjustment, a lever pivoted to said frame and adjustably linked to the first-named lever, and a connection between said lever and the shovel-equipped rock-shaft whereby forward movement of the lower end of the lever shall raise said shovels or permit the latter to rise without affecting said lever.

5. In a cultivator, a tongue, a frame rigid therewith, a rock shaft equipped with ground wheels and cultivating devices, a lever for rocking said shaft, means to secure said lever at the desired point of adjustment, arms rigid with and projecting rearward from said rock-shaft, a rock shaft journaled in said arms and equipped with shovels, a lever pivoted to the frame and provided with a pin, a spring-actuated hook carried by said lever, a link pivoted to the first-named lever and having a slot engaged by said hook and provided with a longitudinal series of notches of which one is normally held by said hook in engagement with said pin, and a connection between said lever and the shovel-equipped rock shaft whereby forward movement of the lower end of the lever shall raise said shovels or permit the latter to rise without affecting said lever.

In testimony whereof I affix my signature, in the presence of two witnesses.

ELMER M. SWANSON.

Witnesses:
 ANNETTE THORPE,
 G. Y. THORPE.